US012725625B2

(12) United States Patent
Bin et al.

(10) Patent No.: US 12,725,625 B2
(45) Date of Patent: Sep. 1, 2026

(54) METHOD AND AUDIO PROCESSING SYSTEM FOR WIND NOISE SUPPRESSION

(71) Applicant: DOLBY LABORATORIES LICENSING CORPORATION, San Francisco, CA (US)

(72) Inventors: Qingyuan Bin, Beijing (CN); Yuanxing Ma, Beijing (CN); Zhiwei Shuang, Beijing (CN)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 149 days.

(21) Appl. No.: 18/844,562

(22) PCT Filed: Mar. 8, 2023

(86) PCT No.: PCT/US2023/014793
§ 371 (c)(1),
(2) Date: Sep. 6, 2024

(87) PCT Pub. No.: WO2023/172609
PCT Pub. Date: Sep. 14, 2023

(65) Prior Publication Data

US 2025/0191601 A1 Jun. 12, 2025

Related U.S. Application Data

(60) Provisional application No. 63/432,996, filed on Dec. 15, 2022, provisional application No. 63/327,030, filed on Apr. 4, 2022.

(30) Foreign Application Priority Data

Mar. 10, 2022 (WO) ................ PCT/CN2022/080242

(51) Int. Cl.
*G10L 21/0232* (2013.01)

(52) U.S. Cl.
CPC ................................ *G10L 21/0232* (2013.01)

(58) Field of Classification Search
CPC ............. G10L 21/0232; G10L 21/0208; G10L 2021/02161
See application file for complete search history.

(56) References Cited

U.S. PATENT DOCUMENTS 8,781,137 B1 7/2014 Goodwin
9,313,597 B2 4/2016 Dickins et al.
(Continued)

FOREIGN PATENT DOCUMENTS

CN 112309417 A 2/2021
DE 102010012941 A1 4/2011
(Continued)

OTHER PUBLICATIONS

Mitsuya, Takashi et al., Auditory feedback and articulatory timing, Program abstracts of the 158th meeting of the Acoustical Society of America, Journal of the Acoustical Society of America, 2009. 39 pages.

*Primary Examiner* — James K Mooney

(57) ABSTRACT

The present disclosure relates to a method and system (1) for suppressing wind noise. The method comprises obtaining an input audio signal (100, 100') comprising a plurality of consecutive audio signal segments (101, 102, 103, 101', 102', 103') and suppressing wind noise in the input audio signal with a wind noise suppressor module (20) to generate a wind noise reduced audio signal. The method further comprises sing a neural network (10) trained to predict a set of gains for reducing noise in the input audio signal (100, 100') given samples of the input audio signal (100, 100'), wherein a noise reduced audio signal is formed by applying said set of gains to the input audio signal (100, 100') and mixing the wind noise reduced audio signal and the noise
(Continued)

reduced audio signal with a mixer (30) to obtain an output audio signal with suppressed wind noise.

20 Claims, 6 Drawing Sheets

(56) References Cited

U.S. PATENT DOCUMENTS

| | | | | |
|---|---|---|---|---|
| 9,343,056 | B1 | 5/2016 | Goodwin | |
| 10,721,562 | B1 | 7/2020 | Rui | |
| 11,217,264 | B1 * | 1/2022 | Yang | G10L 25/51 |
| 2007/0021958 | A1 | 1/2007 | Visser | |
| 2008/0310646 | A1 | 12/2008 | Amada | |
| 2012/0207325 | A1 | 8/2012 | Taenzer | |
| 2013/0308784 | A1 | 11/2013 | Dickins | |
| 2020/0380945 | A1 | 12/2020 | Woodruff | |
| 2020/0382859 | A1 | 12/2020 | Woodruff | |
| 2021/0110840 | A1 * | 4/2021 | Chu | H04L 65/403 |
| 2021/0151069 | A1 | 5/2021 | Hijazi | |
| 2021/0195343 | A1 | 6/2021 | Aubreville | |

FOREIGN PATENT DOCUMENTS

| | | | |
|---|---|---|---|
| JP | 2008227595 | A | 9/2008 |
| JP | 2014102317 | A | 6/2014 |
| WO | 2022026948 | A1 | 2/2022 |

* cited by examiner

METHOD AND AUDIO PROCESSING SYSTEM FOR WIND NOISE SUPPRESSION

CROSS-REFERENCE TO RELATED APPLICATIONS

This application is the U.S National stage entry of International Patent Application No. PCT/US2023/014793 filed Mar. 8, 2023, which claims priority of the U.S. Provisional Application No. 63/432,996 filed Dec. 15, 2022, U.S. Provisional Application No. 63/327,030 filed Apr. 4, 2022 and International Patent Application No. PCT/CN2022/080242 filed Mar. 10, 2022, all of which is incorporated herein by reference in its entirety.

TECHNICAL FIELD OF THE INVENTION

The present invention relates to a method and audio processing system for wind noise suppression.

BACKGROUND OF THE INVENTION

There are many types of unwanted noise which can be present in audio signals including non-stationary noise (e.g. traffic noise or wind noise) and stationary noise (e.g. white or pink noise). Any noise will decrease the signal to noise ratio of the audio signal and degrade the perceived quality of the audio signal. For instance, at high noise levels the intelligibility of speech content decreases and/or the rendering of spatial audio objects becomes less accurate. Noise caused by wind, i.e. wind noise, is especially disruptive for many types of audio content including speech.

Wind noise is commonly present in audio signals recorded by headsets (e.g. wireless binaural headsets), external microphones or cellphones as a user moves rapidly through the air (e.g. when riding a bicycle) or experiences windy conditions outdoors. Wind noise is unpredictable and may appear and disappear in the audio content suddenly, causing an uncomfortable listening experience for a listener while also obscuring the desired audio content in the audio signal. In general, most of the spectral energy of wind noise lies in the lower audible frequencies, below 2 kHz, which unfortunately overlaps with a portion of the frequency band associated with human speech, making wind noise especially disruptive for speech, causing problems for e.g. telephony or teleconferencing applications.

To reduce wind noise various solutions have been proposed. When recording audio signals with professional equipment (e.g. using dedicated microphones such as boom microphones) different types of physical filters are fitted over the microphone to protect it from strong gusts of wind from reaching the sensitive recording element of the microphone. Examples of such physical filters are different windscreen filters, pop-filter or mufflers. However, in many applications microphones are small and integrated in e.g. an earpiece of a set of earphones or in a cellphone making it difficult or impossible to use these generally large and bulky physical filters.

To this end, different audio processing schemes have been proposed for reducing wind noise in audio signals. In some such processing schemes, a wind detector and a wind suppressor are used to form a noise suppression system which operates on two audio signals. The wind noise detector has a plurality of analyzers, such as spectral slope analyzers, ratio analyzers, coherence analyzers, phase variance analyzers and the like, wherein the detection result of each analyzer is weighted together to form a total wind noise detection result for each of the two audio signals. The wind suppressor has a computing unit which calculates a ratio based on the wind noise detection result for each of the two audio signals and a mixer which mixes the two audio signals based on the wind noise detection result and the ratio of the computing unit.

In accordance with other suggested processing schemes a neural network trained to predict gains for removing noise in a mono audio signal is used. When processing two audio signals (e.g. stereo audio signal pairs) each audio signal is processed individually, and the maximum gain predicted for either audio signal is applied to both audio signals to minimize distortions and maintain the perceived position of spatial audio objects. As this noise reduction technique is aggressive a remix module is also used which reintroduces the original (noisy) audio signal by mixing it with the noise reduced audio signals.

GENERAL DISCLOSURE OF THE INVENTION

A drawback with the prior audio processing solutions for wind noise reduction is that when wind noise is only present in one audio signal out of two audio signals the output audio signals will still contain a high level of residual noise. To circumvent these issues, more aggressive noise processing techniques could be used in combination with a remixer which reintroduces some of the original audio signal to mitigate acoustic distortions. However, when the wind noise is strong the reintroduction of the original audio signal will rapidly reintroduce a noticeable level of wind noise into the audio signals. Accordingly, there is a need for an improved method of suppressing wind noise which overcomes at least some of the shortcomings mentioned in the above.

A first aspect of the present invention relates to method for suppressing wind noise comprising obtaining an input audio signal comprising a plurality of consecutive audio signal segments. The method further comprises suppressing wind noise in the input audio signal with a wind noise suppressor module to generate a wind noise reduced audio signal, the wind noise suppressor module comprising a high-pass filter and using a neural network trained to predict a set of gains for reducing noise in an input audio signal given samples of the input audio signal, wherein a noise reduced audio signal is formed by applying the set of gains to the input audio signal. The method also comprises mixing the wind noise reduced audio signal and the noise reduced audio signal with a mixer to obtain an output audio signal with suppressed wind noise.

The wind noise suppressor module may be any wind noise suppressor which performs some filtering or masking of the input audio signal with the purpose of removing wind noise. The resulting wind noise reduced audio signal is therefore a processed version of the input audio signal with the wind noise removed. The wind noise reduced audio signal may still feature one or more other types of noise, such as static white noise and dynamic traffic noise. The neural network is a noise suppression neural network, or a source separation neural network, trained to isolate desired audio content (e.g. speech or music) by suppressing all types of noise or audio content which is not desired. The resulting noise reduced audio signal is therefore a processed version of the input audio signal with one or more types of noise reduced. It is envisaged that the gains predicted neural network removes static noise as well as dynamic noise, e.g. wind noise.

The inventors have realized that by mixing the wind noise suppressed audio signal with the noise suppressed audio signal wind noise suppression is achieved without introducing unwanted distortions. Additionally, the remixing issues are also resolved as the original input audio signal is not reintroduced.

Using only a neural network may introduce unwanted artifacts as the aggressive noise reduction could cause noticeable distortion. Additionally, the neural network may remove important ambiance audio content which is important for immersion. The wind noise suppressor on the other hand will suppress wind noise and leave all other types of noise which are both unwanted and important for providing an immersive effect. By combining the two processed audio signals with a mixing ratio the resulting output audio signal will have the wind noise reduced due to processing by both the wind noise suppressor and the neural network, the desired audio content is left by both processing schemes and the non-wind related noise is left by the wind noise suppressor and partially by the neural network. Thus, the resulting output audio signal inherently suppresses wind noise and promotes the desired audio content while the other types of noise content are partially suppressed. Any distortions introduced by the aggressive neural network noise reduction is compensated by the output audio signal from the wind noise suppressor which is less prone to introduce distortions.

In some implementations the method further comprises determining, with a wind noise detector, a wind noise indicator for each segment of the input audio signal, the wind noise indicator indicating at least one of a probability and a magnitude of wind noise in each segment. Optionally, the method further comprises determining, based on the wind noise indicator, a wind noise state. In some implementations the wind noise indicator is equal to the wind noise state. In some implementations the wind noise state obtained by smoothing the wind noise metric to avoid a rapidly fluctuating steering with a rapidly fluctuating the wind noise metric.

The wind noise indicator or wind noise state may be used to control the at least one of the processes: (A) suppressing wind noise with the wind noise suppressor, (B) the manner in which the set of gains is applied to the input audio signal to form the noise reduced audio signal and (C) the mixing of the noise reduced, and the wind noise reduced, audio signal. This means that the wind noise suppression method adapts dynamically to a current wind noise condition.

In some implementations, each of the input audio signal, wind noise reduced audio signal and the noise reduced audio signal comprises two audio channels, and the method further comprises providing the wind noise state to a gain steering module if the wind noise state for the two channels exceeds a first threshold level or if a difference between the wind noise states of the two channels is below a second threshold level determining, a common set of gains based on the predicted set of gains of at least one of the two channels and applying the common set of gains to both channels. Otherwise the method comprises applying each individual set of gains to the corresponding channel.

Thus, the method avoids applying different sets of gains when there is a small difference in wind noise between the channels or when the channels contain a similar amount of wind noise. This ensures that any spatial effects of the two channels is not distorted when there are similar or low levels of wind noise in both channels. On the other hand, when one of the channels comprises strong wind noise, or when there are large differences in the amount of noise content between the two channels the method applies different set of gains to the different channels to suppress wind noise when it is most needed at the cost of potentially causing spatial distortions.

In some implementations, determining a wind noise state comprises providing the wind noise indicator to a state machine with at least two states, a no-wind-noise state, NWN, and a wind-noise-hold state, WNH. The state machine transitions to the WNH state in response to detecting a first number of subsequent segments associated with a wind noise indicator exceeding a high threshold and outputs a high wind noise state, at least until the next state change the state machine transitions to the NWN state in response to detecting a second number of subsequent segments associated with a wind noise indicator being below a first low threshold and outputs a low wind noise state at least until the next state change. Optionally, the state machine comprises four states.

With a state machine a stable wind noise state is acquired which ensures that the controlling of the system components which is based om the wind noise state does not suffer from oversteering which could cause noticeable acoustic artifacts due to rapid processing changes.

In some implementations, the input audio signal, wind noise reduced audio signal and noise reduced audio signal comprises two audio channels and the method further comprises determining, with a Dual-Mono detector, a difference measure for the two audio channels, the difference measure indicating a difference in spectral energy in at least one frequency band of the two audio channels. If the difference measure is less than a difference threshold, the method comprises determining the wind noise indicator based only on monaural features of each individual audio channel. Otherwise, the method comprises determining the wind noise indicator based on both monaural features of each audio channel and difference features associated with both audio channels.

Examples of monoaural features determined for a single channel are the spectral slope of one or more frequency bands and power density centroids of one or more frequency bands. Examples of difference features are measures of the difference in spectral power, coherence and phase for one or more corresponding frequency bands of the two audio channels.

Thus, by determining to what extent the channels are different, and adapting the method for determining the wind noise indicator accordingly, a wind noise indicator is extracted which is robust and accurate regardless of the level of difference between the channels of the input audio signal. For instance, without distinguishing between the highly similar and highly different audio channels the difference features may result in false positives indicating strong wind noise due to the channels containing very similar content even though the channels comprise very low, or no, wind noise. In addition, the computational complexity is decreased as only monaural features will be determined for very similar audio signals.

According to a second aspect of the invention there is provided a wind noise suppression system, comprising a processor and a memory coupled to the processor, wherein the processor is adapted to perform the method of the first aspect of the invention.

According to a third aspect of the invention there is provided a computer program product comprising instructions which, when the program is executed by a computer, causes the computer to carry out the method according to the first aspect of the invention.

According to a fourth aspect of the invention there is provided a computer-readable storage medium storing the computer program according to the third aspect of the invention.

The invention according to the second, third and fourth aspects features the same or equivalent benefits as the invention according to the first aspect. Any functions described in relation to a wind noise suppression method may have corresponding features in a wind noise suppression system, and vice versa.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

Figure 1:
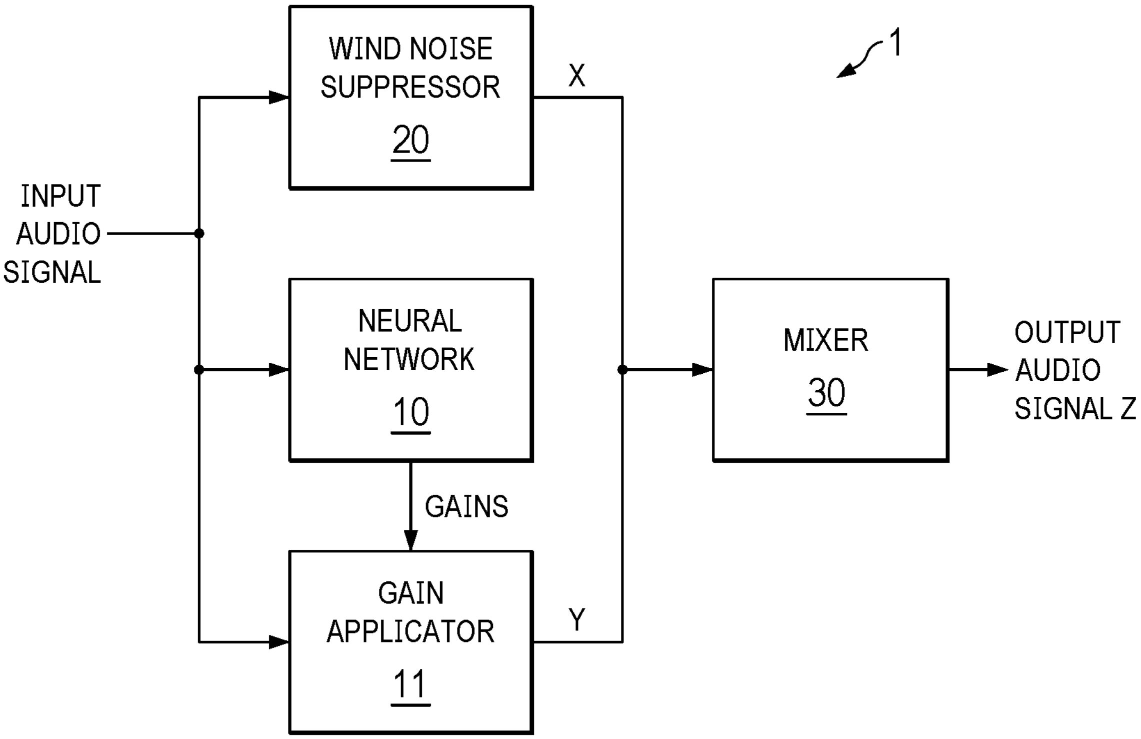
FIG. 1 depicts a system for suppressing wind noise according to some implementations.

Systems and methods disclosed in the present application may be implemented as software, firmware, hardware or a combination thereof. In a hardware implementation, the division of tasks does not necessarily correspond to the division into physical units; to the contrary, one physical component may have multiple functionalities, and one task may be carried out by several physical components in cooperation. The computer hardware may for example be a server computer, a client computer, a personal computer (PC), a tablet PC, a set-top box (STB), a personal digital assistant (PDA), a cellular telephone, a smartphone, a web appliance, a network router, switch or bridge, a wearable device (XR or AR or VR or MR headset, an audio headset, etc.) or any machine capable of executing instructions (sequential or otherwise) that specify actions to be taken by that computer hardware. Further, the present disclosure shall relate to any collection of computer hardware that individually or jointly execute instructions to perform any one or more of the concepts discussed herein.

Certain or all components may be implemented by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system (i.e. a computer hardware) that includes one or more processors. Each processor may include one or more of a CPU, a graphics processing unit, and a programmable DSP unit. The processing system further may include a memory subsystem including a hard drive, SSD, RAM and/or ROM. A bus subsystem may be included for communicating between the components. The software may reside in the memory subsystem and/or within the processor during execution thereof by the computer system.

The one or more processors may operate as a standalone device or may be connected, e.g., networked to other processor(s). Such a network may be built on various different network protocols, and may be the Internet, a Wide Area Network (WAN), a Local Area Network (LAN), or any combination thereof.

The software may be distributed on computer readable media, which may comprise computer storage media (or non-transitory media) and communication media (or transitory media). As is well known to a person skilled in the art, the term computer storage media includes both volatile and non-volatile, removable and non-removable media implemented in any method or technology for storage of information such as computer readable instructions, data structures, program modules or other data. Computer storage media includes, but is not limited to, physical (non-transitory) storage media in various forms, such as EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by a computer. Further, it is well known to the skilled person that communication media (transitory) typically embodies computer readable instructions, data structures, program modules or other data in a modulated data signal such as a carrier wave or other transport mechanism and includes any information delivery media.

FIG. 1 depicts a system 1 for suppressing wind noise according to some embodiments. The components of the system 1 may be implemented by a computer, comprising a processor and a memory coupled to the processor. An input audio signal is received and provided to a wind noise suppressor module 20 and to a neural network 10 trained to predict a set of gains for reducing noise given samples of the input audio signal. The predicted set of gains is provided to a gain applicator 11 which applies the gains to the input audio signal and provides the resulting noise reduced audio signal Y to a mixer 30. The mixer 30 also receives the wind noise reduced audio signal X from the wind noise suppressor module 20 and mixes these two audio signals with a mixing ratio dictated by a mixing coefficient $\mu$ to generate the output audio signal Z.

The input audio signal comprises one or more audio channels. In some implementations the input audio signal comprises wind noise mixed with desired audio content, and optionally other forms of noise such as static white noise, static pink noise and/or non-static traffic noise. The neural network 10 is any type of neural network trained to predict a set of gains for suppressing all types of noise besides a target source (e.g. speech or music). The neural network could be implemented as an RNN, CNN, etc.

The predicted set of gains comprises a plurality of gains, each gain associated with an individual frequency band of the segment. The term “gain” is used herein, and it is understood that a “gain” may entail either an actual gain (i.e. an amplification) or attenuation (i.e. amplitude reduction). Most noise reduction neural networks 10 are trained to predict gains for all audio content which differs from the desired audio content (e.g. speech or music). For instance, if a certain frequency band in a segment of the input audio signal comprises noise and little, or no, desired audio content the neural network 10 will output a gain which suppresses this frequency band for this segment. It is understood that the process is dynamic and the frequency bands that are suppressed, and the extent to which they are suppressed, varies from segment-to-segment as the spectral distribution of desired audio content, and the noise, varies over time.

The wind noise suppressor 20 is configured to suppress wind noise in the input audio signal. As wind noise often appears in a low frequency range (below 2 kHz) the wind noise suppressor comprises a high-pass filter with a cutoff-frequency and optionally a pass-band varying gain. In some implementations, the cutoff-frequency and the pass-band gain is dynamically adjustable (based on a wind noise indicator/state) as is described in the below.

The wind noise suppressor 20 is configured to remove wind noise from the audio signal. As wind noise is typically present at low frequencies the wind noise suppressor will generally not remove high frequency noise such as the high frequency components of static white or pink noise. The neural network 10 on the other hand typically performs much more aggressive noise suppression wherein all noise content which is not recognized as desired audio content is suppressed. This may entail that the neural network 10 produces gains for suppressing static noise (e.g. white noise) as well as dynamic noise such as wind noise or traffic noise. While a neural network 10 can be very effective in isolating the desired audio content it may cause unwanted distortions or misclassify desired audio content as noise whereas the analytical wind noise suppressor 20 operates in a more controlled and predicable fashion.

Figure 2A:
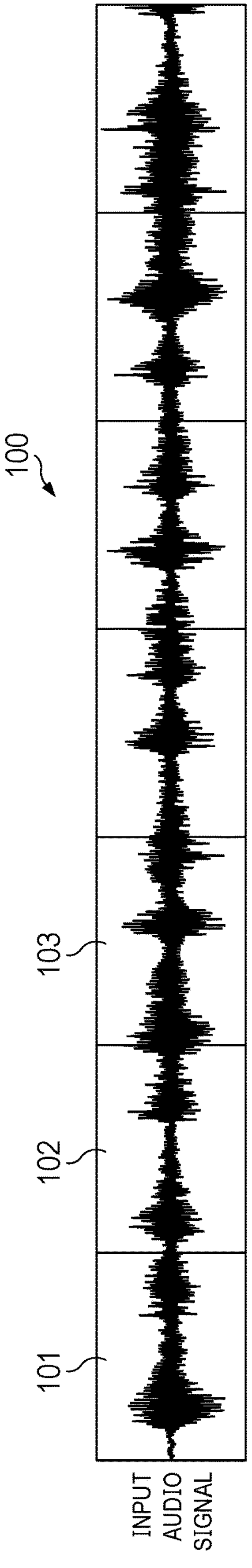
FIG. 2*a* depicts schematically an input audio signal with a single channel some implementations.

FIG. 2*a* depicts schematically an input audio signal 100. The input audio signal comprises a plurality of consecutive segments 101, 102, 103 wherein each segment comprises a portion of the audio signal 100. A plurality of segments 101, 102, 103 may form a complete audio file of any duration (e.g. ranging from a few minutes if the audio file is a music track to several hours if the audio file is speech content of a telephone call or the soundtrack of a movie). Each segment may be of any suitable length. In some implementations each segment 101, 102, 103 is between 2 milliseconds and 50 milliseconds long, such as 5 or 10 milliseconds.

The input audio signal 100 can be represented in time domain or in frequency domain. The input audio signal 100 may be represented with time-frequency tiles or represented with a filter bank (e.g. QMF filterbank) as is known to the person skilled in the art. The input audio signal may comprise one channel or two or more channels.

Figure 2B:
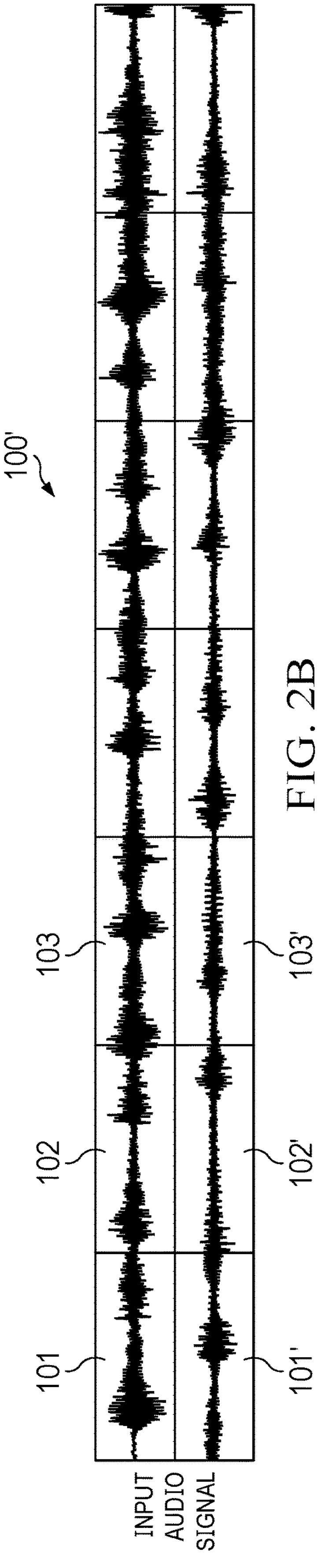
FIG. 2*b* depicts schematically a different input audio signal with two channels some implementations.

In FIG. 2*b* an input audio signal 100' comprising two audio channels is depicted. As seen, the two audio channels are divided in corresponding segments 101, 102, 103, 101', 102', 103'. The two audio channels are processed separately or together in the wind noise suppression system of FIG. 1. For instance, the wind noise suppressor may determine and apply different high-pass filters to the two channels or a common filter. Similarly, the neural network may predict an individual set of gains for each channel whereby the gain applicator applies the individual set of gains to the corresponding channel or combines the individual sets of gains into a common set of gains as will be described in the below.

The two audio channels may be any type of audio channels such as stereo, binaural audio channels or any selection of two arbitrary channels. The stereo audio channels may e.g. be a left and right audio channel. It is also envisaged that the stereo audio channels are of a different stereo presentation, e.g. formed by a mid and side audio channel. The two audio channels may contain the same or at least very similar audio content (as is the case for e.g. center-panned stereo music content) or audio content with no or very little audio content in common (e.g. the audio content intended for a center loudspeaker and a rear-left loudspeaker in a 5.1 presentation of a sound file associated with a movie).

Figure 3:
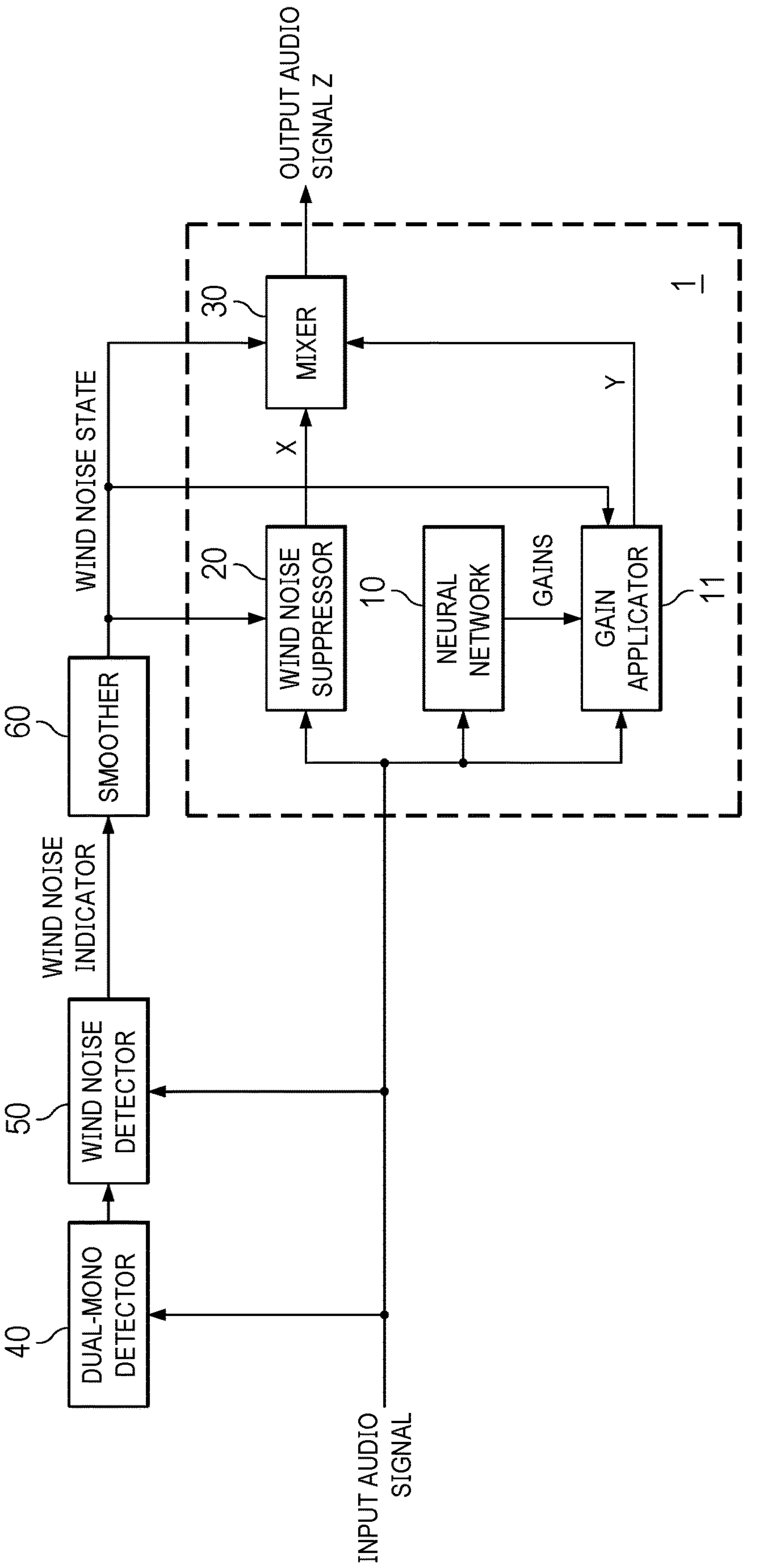
FIG. 3 depicts a system for suppressing wind noise with a smoothing module in addition to a Dual-Mono detector, a wind noise detector and a smoother according to some implementations.

FIG. 3 depicts the system 1 for wind noise suppression of FIG. 1 wherein a Dual-Mono detector 40 and a wind noise detector 50 has been added.

The wind noise detector 50 analyses the input audio signal and determines, for each segment of the input audio signal, a wind noise indicator. The wind noise indicator is a measure (e.g. one or more numerical values) indicating whether or not wind noise is present in the input audio signal. To this end, the wind noise indicator may be a measure of the wind noise magnitude or probability. The wind noise indicator could be a binary value (i.e. indicating that wind noise is present or that wind noise is not present) or a scalar value (soft score) indicating the magnitude/probability of wind noise in each segment. For example, a scalar value (soft score) may range from 0 to 1 with smaller values indicating lower wind noise magnitude/probability and higher values indicating higher wind noise magnitude/probability.

The wind noise detector 50 extracts several features from the input audio signal and determines, based on these features, the wind noise indicator. The wind noise indicator may determine monaural features for each individual channel of the input audio signal and/or determine difference features based on at least two channels of the input audio signal. The wind noise detector 50 may determine at least one of the following features: a spectral slope in one or more frequency bands of a channel, a power centroid in one or more frequency bands of a channel, a power ratio between two channels in at least one frequency band, a coherence between two channels in at least one frequency band, a phase difference between two channels within at least one frequency band and determine the wind noise indicator based on the determined feature(s) for each channel and segment of the input audio signal.

The wind noise detector 50 could also be implemented by traditional machine learning algorithms such as a support vector machine, AdaBoost, or a deep neural network according to available computing resources.

At least one of the wind noise indicator and the wind noise state (which is derived from the wind noise indicator) is provided to at least one of the mixer 30, the wind noise suppressor 20, and the gain applicator 11 to dynamically control the operation of at least one of the components.

In FIG. 3 the wind noise indicator is provided to a smoother 60, which extracts the wind noise state by smoothing the wind noise indicator as is described in further detail in the below, whereby the wind noise state is provided to at least one of the mixer 30, the wind noise suppressor 20, and the gain applicator 11 to dynamically control the operation of at least one of the components. In some implementations, the wind noise indicator is instead provided to at least one of the mixer 30, the wind noise suppressor 20, and the gain applicator 11 (e.g. when no smoother 60 is present) to dynamically control the operation of at least one of the components. It is also envisaged that both the wind noise indicator and the wind noise state may be provided to at least one of the mixer 30, the wind noise suppressor 20, and the gain applicator 11.

The mixer 30 may receive the wind noise indicator and/or wind noise state and alter the mixing coefficient μ (mixing ratio) accordingly. In FIG. 3, the wind noise reduced audio signal from the wind noise suppressor 20 is labeled X and noise reduced audio signal from the gain applicator 11 is labeled Y. The mixer 30 mixes the outputs X and Y to from the output audio signal Z based on the mixing coefficient μ in accordance with $$Z=\mu Y+(1-\mu)X. \quad (1)$$

That is, the mixing coefficient μ dictates a mixing ratio for X and Y.

The wind noise indicator and/or wind noise state will influence the value of the mixing coefficient μ and thereby put more or less emphasis on X or Y in the output Z. In some implementations μ is toggled between two values, such as μ=0.9 and μ=0.6, wherein the higher value is assigned when the wind noise indicator and/or wind noise state indicates a high level of wind noise and the lower value is assigned when the wind noise indicator and/or wind noise state indicates a low level of wind noise. It is also envisaged that with a scalar valued wind noise indicator and/or wind noise state the mixing coefficient μ is interpolated between the two values based on the scar value.

Alternatively, the mixing coefficient μ could be static or specified by a user wherein if cleaner audio is desired μ is set to 0.75, and if more environment ambiance sound is desirable μ is set to 0.5. The value of μ could also be chosen according to environment context.

The wind noise suppressor 20 may receive the wind noise indicator and/or wind noise state and perform wind noise suppression based on the wind noise indicator. For example, properties of the high-pass filter are adjusted based on the wind noise indicator and/or wind noise state. For a scalar valued (soft score) wind noise indicator the high-pass filter gain, HPF, for a given frequency band b may be determined as $$HPF(b)=\min\left(1.0,\ 10^{\frac{w(A+STEP*b)}{10}}\right) \quad (2)$$

wherein A is the maximum attenuation in decibels (for instance a value of −30 dB can be used) and the entity STEP is obtained by solving equation $A+STEP*b_{max}=0$, meaning that $STEP=-A/b_{max}$, and $b_{max}$ is the highest frequency band in which wind noise is detected (e.g. 1.6 kHz). The variable w is the scalar wind noise indicator and/or wind noise state. Thus, from the high-pass filter defined by equation 2 in the above it is clear that frequency bands below $b_{max}$ will be suppressed whereas the frequencies above $b_{max}$ will be left unaffected.

If only a binary wind noise indicator and/or wind noise state is available, the wind noise power spectral density N(n, f) is determined via recursive smoothing of the squared wind noise spectral magnitude as $$\Phi(n,f)=a(n)\Phi(n-1,f)+(1-a(n))|N(n,f)|^2,\ f<F \quad (3)$$

wherein a(n) and F are assigned values, such as a(n)=0.8 and F=1.6 kHz. The wind noise power $|N(n,f)|^2$ is only determined for wind noise segments associated with the high binary wind noise indicator and/or wind noise state. With the wind noise power spectral density determined, classical noise reduction algorithms such as spectral subtraction may be used by the wind noise suppressor 20 to reduce the wind noise. That is, applying the high-pass filter may comprise performing spectral subtraction of the estimated wind noise power spectral density.

The gain applicator 11 may receive the wind noise indicator and/or wind noise state from the wind noise detector 50 and modify the gain application based on the wind noise indicator and/or wind noise state. This is especially beneficial when the input audio signal comprises two audio channels, wherein the wind noise detector 50 has determined a wind noise indicator and/or wind noise state for each segment of each channel and the neural network has predicted an individual set of gains for each channel. The gain applicator 11 will analyze the wind noise indicator and/or wind noise state for each channel and determine, based on the wind noise indicator and/or wind noise state from each channel, whether to apply each set of gains to the respective channel (mode A) or determine a common set of gains to be applied to both channels, the common set of gains being based on the individual sets of gains for the respective channel (mode B). The common set of gains could for example be the element-wise maximum or average of the two sets of gains.

If the gain applicator 11 determines that the wind noise indicator and/or wind noise state indicates that only one channel features wind noise (exceeds a first threshold level $\gamma_1$) or if the difference in wind noise indicator and/or wind noise state between the channels exceeds second threshold level $\gamma_2$ the gain applicator 11 will operate in mode A.

If the gain applicator 11 determines that the wind noise indicator and/or wind noise state indicates that both channels feature wind noise (exceeds the first threshold level $\gamma_1$) or if difference in wind noise indicator and/or wind noise state between the channels is below the second threshold level $\gamma_2$ the gain applicator 11 will operate in mode B.

For example, the second threshold level $\gamma_2$ is selected between 0.1 and 0.3, such as γ=0.2. There are also many suitable values for the first threshold level $\gamma_1$. For example, $\gamma_1$ may be selected from within the interval of 0.1 to 0.6, such as 0.5 or 0.25. However, these values of $\gamma_2$ and $\gamma_1$ are merely exemplary and other values of $\gamma_2$ and $\gamma_1$ are envisaged depending on the properties (e.g. the sensitivity) of the wind noise detector 50.

Mode A ensures sufficient wind noise attenuation for a channel which contains very strong wind noise whereas mode B ensures not to introduce different filtering of the two channels for small amounts of wind noise which could alter the spatial balance of the two channels in an unwanted and distracting manner.

As described in the above, the wind noise detector 50 determines the wind noise indicator based on monaural channel features and/or based on difference features between two channels. If the input audio signal is a mono audio signal only monaural channel features can be used. However, if the input audio signal comprises two or more channels the wind noise detector may use either or both of the monaural channel features and difference features.

To enhance accuracy when determining the wind noise indicator for two input channels, it is important to detect to what extent the two channels of the input audio signal are similar in terms of audio content. If the channels contain similar or equal audio content according to a difference measure, the wind noise detector 50 will only use monaural features when determining the wind noise indicator. Such audio channels associated with a low difference measure are herein referred to as Dual-Mono audio channel pairs as highly similar channels may resemble a duality of the same mono audio signal. On the other hand, if the channels are less similar (i.e. associated with a high difference measure) the wind noise detector 50 will use both monaural features and channel difference features for each audio channel.

It is understood that a pair of audio channels exhibiting a low difference measure will have much audio content in common between the channels whereas a pair of audio channels with a higher difference measure has little, or no, audio content in common.

To this end, the system 1 comprises a Dual-Mono detector 40 configured to determine whether or not the two channels of the input audio signal are sufficiently different from each other to enable the wind noise detector 50 to use both channel difference features and monaural features when determining the wind noise indicator. The Dual-Mono detector 40 analyzes the audio channels and determines the difference measure. The difference measure may e.g. indicate at least one of a difference in spectral energy in one or more frequency bands.

In one implementation, the Dual-Mono detector 40 operates in the frequency domain (e.g. in the Short-Time-Fourier-Transform, STFT, domain) and calculates a sum, S, of the absolute value of the spectral difference between a first and a second channel as $$S=\sum_{b_1}^{b_2}\left|\left(\mathrm{real}_{CH1,b}^2+imag_{CH1,b}^2\right)-\left(\mathrm{real}_{CH2,b}^2+imag_{CH2,b}^2\right)\right| \quad (4)$$

wherein b is the band index, ranging from the low band-index $b_1$ to the high band index $b_2$ and CH1 and CH2 denotes the first and second channel respectively. The Dual-Mono detector 40 further calculates the total energy of each channel individually, $E_1$, $E_2$, as $$E_1=\sum_{b_1}^{b_2}\left(\mathrm{real}_{CH1,b}^2+imag_{CH1,b}^2\right) \quad (5)$$

$$E_2=\sum_{b_1}^{b_2}\left(\mathrm{real}_{CH2,b}^2+imag_{CH2,b}^2\right). \quad (6)$$

With the sum S and the individual channel energies $E_1$, $E_2$ determined the Dual-Mono detector 40 determines a normalized sum (ratio) $S_N$ as $$S_N=\frac{S}{E_1+E_2}. \quad (7)$$

If the Dual-Mono detector 40 determines that $S_N$ for a segment is less than first predefined threshold $\alpha$ and the total frame energy $E_1+E_2$ is above a second predefined threshold $\beta$, the segment contains sufficiently similar audio channels to be labeled Dual-Mono. If these criteria are not met, the segment is determined to comprise non Dual-Mono audio channels. The Dual-Mono detector 40 conveys information to the wind noise detector 50 indicative of whether the Dual-Mono detector 40 has determined the segment to be a Dual-Mono segment or not, allowing the wind noise detector 50 to selectively use only monaural features (for Dual-Mono channels) or both monaural features and difference features (for non Dual-Mono channels).

The sums S, $S_N$ and the relationship between channel energies $E_1$, $E_2$ are all examples of difference measures which can be used to determine whether the channels are sufficiently similar to use only monaural features.

In some implementations, the Dual-Mono detector 40 comprises a Dual-Mono counter which counts the number of encountered segments having sufficiently similar audio content to be labeled Dual-Mono segments. Once the counter reaches a predetermined number, $N_{decorr}$, the entire input audio signal is classified as a Dual-Mono audio signal and all subsequent segments are treated as Dual-Mono segments. To this end, the Dual-Mono detector 40 can be deactivated once the counter reaches $N_{decorr}$, at least until a next audio signal is input to the system 1. The counter of Dual-Mono detector 40 may be reset each time it detects a segment which does not contain sufficiently similar channels to be classified as a Dual-Mono segment.

As an example, the low band index $b_1=0$, the high band index $b_2=512$, the first predefined threshold $\alpha=10^{-4}$, the second predefined threshold $\beta=10^{-8}$ and $N_{decorr}=40$.

Figure 4:
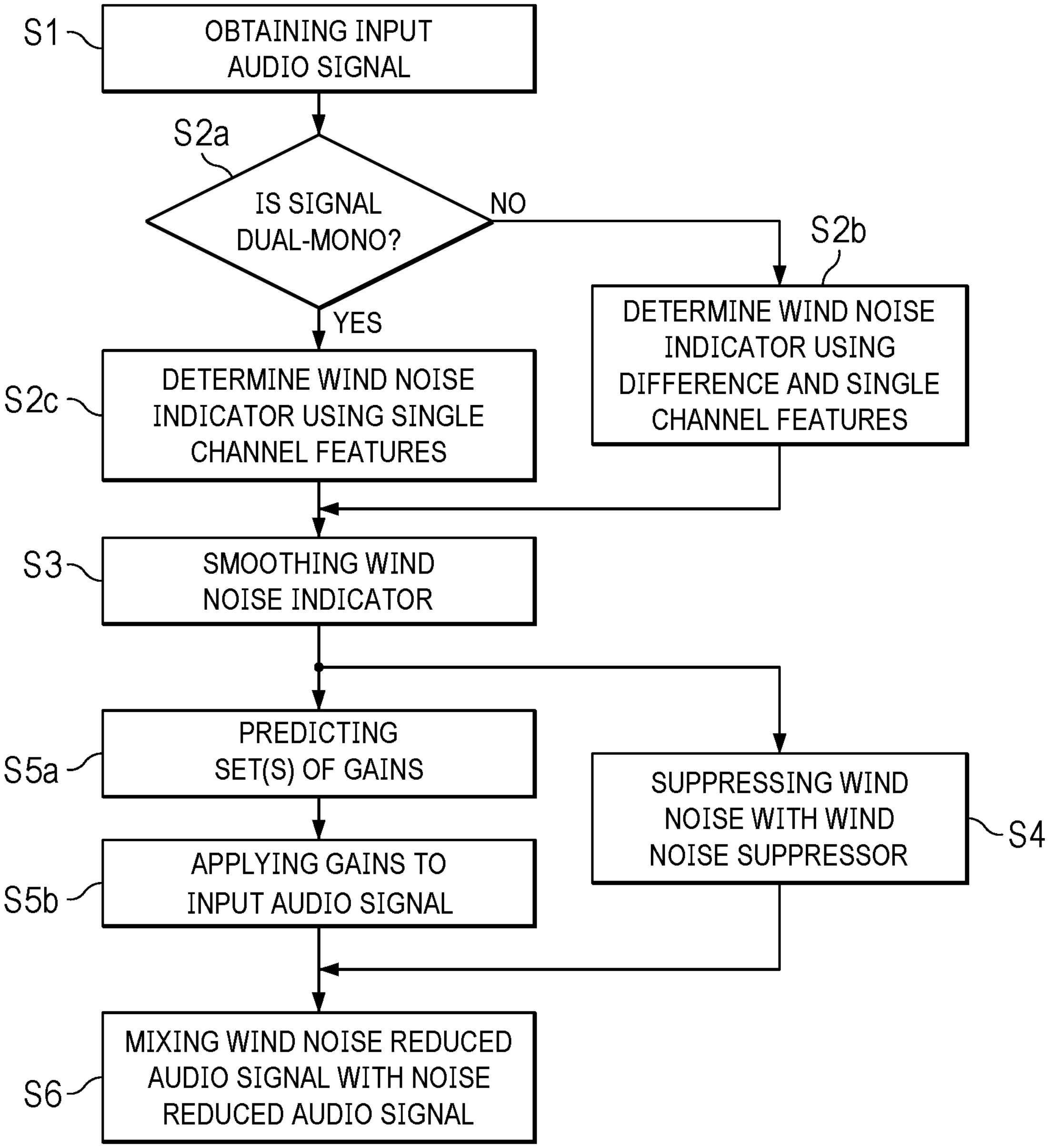
FIG. 4 is a flowchart illustrating a method for suppressing wind noise according to some implementations.

Optionally, the system 1 for wind noise suppression cooperates with a smoothing module 60 which smooths the wind noise indicator. Based on the smoothed wind noise indicator a wind noise state is determined which is used to control the components of the system 1. That is, the wind noise state is a processed version of the wind noise indicator wherein either or both of the wind noise indicator and wind noise state can be used control components as indicated in the above. The wind noise state may e.g. be equal to a smoothed version of the wind noise indicator. With further reference to the flowchart in FIG. 4 a method for suppressing wind noise will now also be described in detail.

At step S1 the input audio signal is obtained and provided to the wind noise suppressor 20, neural network 10, and the gain applicator 11. Additionally, the input audio signal is provided to the Dual-Mono detector 40 which determines at step S2*a* (e.g. in accordance with equations 4-7 in the above) whether the input audio signal comprises similar (Dual-Mono) audio channels or not. If the audio channels are similar, Dual-Mono, channels the method goes to S2*b* and determines a wind noise indicator for each channel based on only monaural features. On the other hand, if the audio channels are determined to be dissimilar, i.e. non Dual-Mono channels, the method goes to S2*c* and determines a wind noise indicator for each audio channel based on both monaural features and channel difference features.

Optionally, the wind noise indicator is provided to a smoothing module 60 which smooths the wind noise indicator at step S3 to obtain a more stable wind noise state.

The smoothing module 60 smooths the wind noise indicator across a plurality of neighboring segments to obtain a more stable wind noise state from the wind noise indicator. The wind noise state then replaces the wind noise indicator and is provided to at least one of the mixer 30, wind noise suppressor 20, and gain applicator 11 do enable dynamic control of these components in a manner analogous to the wind noise indicator steering highlighted in connection to FIG. 3 in the above.

If the wind noise indicator is a scalar value for each segment the smoothing performed by the smoothing module 60 may entail averaging the wind noise indicator across a plurality neighboring segments. Additionally, if the wind noise indicator is a binary wind noise indicator it is also possible to performing smoothing. For instance, the high binary level is represented with a value of 1 and the low binary level is represented with a value of 0 whereby smoothing across a plurality of frames allows the wind noise state to assume fractional values between 0 and 1. While smoothing using averaging across neighboring segments will eliminate most rapid changes in the steering of the different components in the wind noise suppression system there are still cases in which even an average across many segments could cause rapid toggling between e.g. applying a common set of gains or applying individual sets of gains. To this end, the smoothing module may employ a state machine as described in more detail in the below.

At step S4 the input audio signal is provided to the wind noise suppressor 20 which suppresses wind noise and generates a wind noise reduced audio signal X. The wind noise suppressor 40 may be controlled with the wind noise indicator so as to apply a high-pass filter which varies dynamically with the wind noise indicator or wind noise state as described in equation 2. The wind noise suppressor 40 may determine and apply a separate high-pass filter for each channel or a common high-pass filter for both channels. The common high-pass filter being e.g. the average filter gain for each frequency band.

At step S5*a* the input audio signal is provided to the neural network 10 which predicts a set of gains for each channel, wherein application of the set of gains with the wind nose applicator 11 at step S5*b* reduces the noise in the input audio signal resulting in a noise reduced audio signal Y. As described in the above, the gain applicator may be controlled by the wind noise indicator or wind noise state to determine whether or not the sets of gains should be applied individually to the channels or used to determine a common set of gains which is applied to both channels.

At step S6 the wind noise reduced audio signal X and the noise reduced audio signal Y are combined by the mixer 30 at a mixing ratio. The mixing ration is established by the mixing coefficient μ and may be dynamically steered with the wind noise indicator or wind noise state as described in connection to equation 1 in the above.

Figure 5:
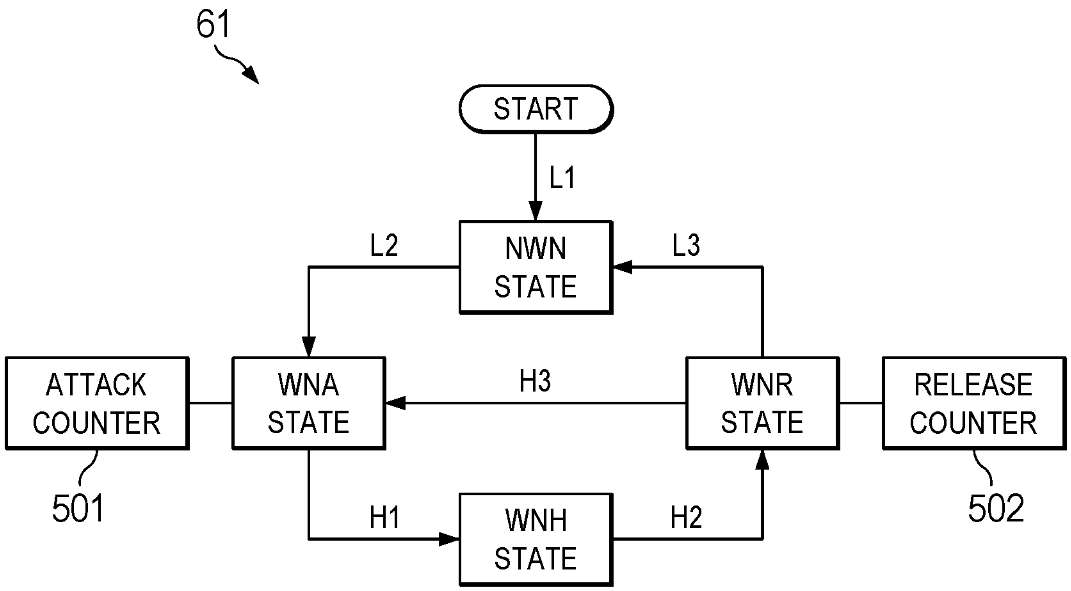
FIG. 5 depicts schematically a state machine with four states which is used in the smoothing module according to some implementations.

The smoothing module 60 may comprise a state machine 61 as depicted in FIG. 5 for smoothing the wind noise indicator to a more stable wind noise state. The state machine comprises four states, a no wind noise, NWN, state, a wind noise attack, WNA, state, a wind noise hold, WNH, state and a wind noise release, WNR, state. In each state, the state machine outputs either a high (e.g. 1) or a low (e.g. 0) wind noise state and the state machine will continue to output the same wind noise state until the state is changed. While some states, such as the NWN state and the WNH state are always associated with the same wind noise state (the low state for NWN and the high state for WNH) some states, such as the WNA state may be associated with either the high or the low wind noise state depending on which state the state machine has transitioned from.

The state machine 61 is evaluated once for each segment (i.e. once for each updated value of the wind noise indicator) and for embodiments with multiple channels one state machine 61 is employed to smooth the wind noise indicator of each channel.

The state machine 61 is configured to start with an initial state of NWN or WNH.

Without loss of generality the state machine 61 of FIG. 5 starts by transitioning over L1 in to the NWN state and outputs the low wind noise state. For each new segment and each associated wind noise indicator the state machine 61 will check if the wind noise indicator is greater than a high threshold $T_{high}$. If the wind noise indicator remains below the high threshold $T_{high}$ the NWN state will be held, and the state machine continues to output the low wind noise state.

If the state machine 61, when in the NWN state, detects a wind noise indicator exceeding $T_{high}$ the state machine 61 transitions over L2 to the WNA state and will continue to output the low wind noise state. When the state machine 61 enters WNA state it also starts an attack counter 501 which counts the number of segments having a wind noise indicator exceeding the high threshold $T_{high}$. As long as the attack counter 501 is below a first predetermined number $N_{acc}$ the WNA state will be kept. If a wind noise indicator being below a first low threshold $T_{low1}$ the attack counter 501 is reset to zero.

When the attack counter 501 reaches $N_{acc}$ the state machine 61 transitions over H1 to the WNH state and the outputted wind noise state is changed from the low wind noise state to the high wind noise state. In the WNH state the state machine 61 checks whether the wind noise indicator is above a second low threshold $T_{low2}$ and as long as wind noise indicator is above the second low threshold $T_{low2}$ the state machine 61 will remain in the WNH state and output the high wind noise state. The second low threshold $T_{low2}$ is greater than the first low threshold $T_{low1}$.

If the state machine 61, when in the WNH state, detects a wind noise indicator being below the second low threshold $T_{low2}$ the state machine 61 transitions over H2 to the WNR state while it continues to output the high wind noise state. At the same time, entrance into the WNR state triggers a release counter 502 which counts the number of segments associated with a wind noise indicator being below the second low threshold $T_{low2}$. As long as the release counter 502 is below a second predetermined number $N_{low}$ the counter will continue to operate and the state machine 61 will remain in the WNR state and output the low wind noise state.

Once the release counter 502 reaches the second predetermined number $N_{low}$ the state machine 61 transitions over L3 to the NWN state and starts to output the low wind noise state.

If the state machine 61, in the WNR state, detects a wind noise indicator being greater than the high threshold the state machine 61 transitions over H3 to the WNA state while keeping the output to the high wind noise state. This is in contrast to when the state machine 61 entered into the WNA state from the NWN state along L2 where the output was fixed to the low wind noise indicator. In some embodiments, the first predetermined number $N_{acc}$ is higher than the second predetermined number $N_{low}$, which biases the state machine 61 towards the NWN state. For example, $N_{low}$=20 and $N_{acc}$=40.

In some embodiments, the second low threshold $T_{low2}$ is the average of the first low threshold and the second low threshold. For example, $T_{low1}$=0.04, $T_{high}$=0.2 and $T_{low2}$=0.12.

Additionally, in some embodiments it is beneficial to use more than two smoothing techniques. For example, the wind noise indicator is first smoothed by averaging across neighboring segments, running a smoothing window over the wind noise indicator or determining a history weighted sum wherein a current wind noise indicator is given the most weight, an earlier wind noise indicator less weight and the earlies considered wind noise indicator the least weight. This traditional smoothing processes generates a smoothed wind noise indicator. The smoothed wind noise indicator is then provided to the state machine 61 which determined an even more stable wind noise state from the smoothed wind noise indicator.

The above described system 1 for wind noise suppression is suitable for real-time (causal) processing and non-real-time (non-causal) processing implementations. However, in some implementations, a context analysis module 70 is added to the wind noise suppression system to further enhance non-real-time processing.

The context analysis module 70 aggregates the segment-by-segment output of the wind noise detector 50 (i.e. the wind noise indicator) and the smoother 60 (i.e. the wind noise state which e.g. is extracted from the wind noise indicator by the state machine) across many segments (e.g. all segments in an audio file) and determines a global wind noise metric $W_p$ for all segments. The context analysis module 70 may e.g. determine a weighted average of the wind noise metric and/or the wind noise state wherein the global wind noise metric is based on (or equal to) the weighted average. In some implementations, the global wind noise metric $W_p$ is a scalar value between 0 and 1, wherein lower values indicates a lower wind noise magnitude/confidence for the analyzed segments and higher values indicates a higher wind noise magnitude/confidence for the analyzed segments.

In some implementations, a wind noise suppression system 1' configured to take advantage of auxiliary sensors and/or auxiliary classifier units is used. The auxiliary sensors may for example be an acoustic sensor (e.g. a microphone), an environmental sensor, a GPS receiver, motion sensor, vibration sensor or any other type of sensor typically available on user devices such as smartphones, earbuds, smartwatches, tablets which are all examples of devices which could implement the wind noise suppression method. The auxiliary classifier units may for example be one of a music classifier, a voice classifier and an acoustic scene classifier. The classifier unit may be implemented in software and/or hardware and are typically available on the example devices described in the above.

Figure 6:
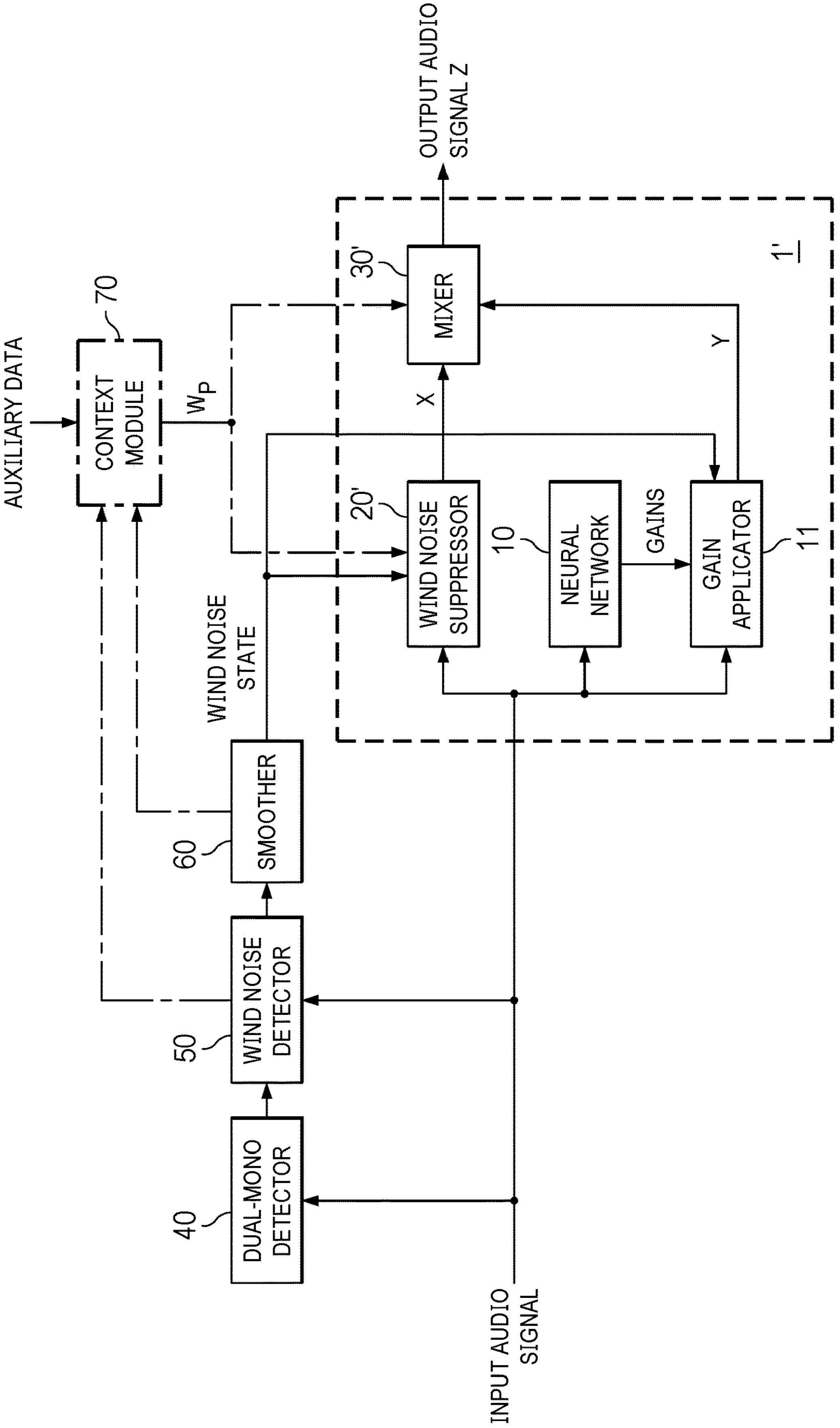
FIG. 6 depicts a system for suppressing wind noise with a context analysis module for enhanced non-real-time processing according to some implementations.

In FIG. 6 this is illustrated with the context analysis module 70 accepting auxiliary data, wherein the auxiliary data is the output of the above mentioned auxiliary sensor and/or auxiliary classifier unit. For example, the auxiliary data originates from a voice activity detection, VAD, classifier unit, a music classifier unit and/or an acoustic scene classifier unit. The context analysis module 70 utilizes the auxiliary data to determine a more accurate global wind noise metric $W_p$. For example, if the auxiliary data indicates that it is likely that a segment comprises speech and/or music (by receiving, in the auxiliary data, a high VAD value or high music classifier confidence) as well as comprising wind noise (due to a high wind noise indicator) the context analysis module 70 may provide this segment with a lower weight when calculating $W_p$ since it is unclear whether or the segment is music, speech or wind. On the other hand, if a segment does not comprise speech and/or music (by receiving in the auxiliary data a low VAD value and/or low music confidence) but does comprise wind noise (due to a high wind noise indicator) the context analysis module 70 may provide this segment with a higher weight when calculating Wp since it the confidence of the segment comprising wind noise is higher.

The global wind noise metric $W_p$ is then provided to at least one of a context modified wind noise suppressor 20' and the mixer 30' which employs a modified type of processing compared to the processing described in the above.

The context modified wind noise suppressor 20' receives the global wind noise metric $W_p$ and determines a high-pass filter in accordance with $$HPF(b) = \min\left(1.0,\ 10^{\frac{W_p * w(A + STEP * b)}{10}}\right) \tag{8}$$

wherein the difference in comparison to the high-pass filter described in equation 2 is that the gain (attenuation) is weighted with the global noise metric indicator $W_p$. For example, if the context analysis module 70 determines that the analyzed segments are, overall, without wind noise the global wind noise indicator $W_p$ will be close to 0 and there will low or no attenuation in the low frequency stop band. On the other hand, if the context analysis module 70 determines that the analyzed segments, overall, contain wind noise the global wind noise indicator $W_p$ will be close to 1 and there will be high levels of attenuation in the low frequency stop band.

The context modified mixer 30' receives the global wind noise indicator $W_p$ and determines a mixing coefficient $\mu_p$ based on $W_p$ in accordance with $$\mu_p = W_p * \mu_1 + (1 - W_p) * \mu_0 \tag{9}$$

wherein $\mu_1$ is higher than $\mu_0$. Typically, $\mu_1$ is between 0.6 to 0.9 such as 0.75 and $\mu_0$ is between 0.4 and 0.6 such as 0.5. The mixing performed by the mixer 30 is then governed by $$Z = \mu_p Y + (1 - \mu_p) X \tag{10}$$

wherein Z is the output audio signal, X is the wind noise suppressed output audio signal from the context modified wind noise suppressor 20' and Y is the audio signal output by the gain applicator module 11 which has applied the set(s) of gains predicted by the neural network 10. Thus, the mixing coefficient $\mu_p$ is kept constant at an interpolated value between $\mu_1$ and $\mu_0$ for the plurality of segments forming the audio file. It is understood that the processing performed with the context analysis module 70 is no longer causal, as later (future) segments will influence $W_p$ that is used to process a current (earlier) segment.

Unless specifically stated otherwise, as apparent from the following discussions, it is appreciated that throughout the disclosure discussions utilizing terms such as "processing", "computing", "calculating", "determining", "analyzing" or the like, refer to the action and/or processes of a computer hardware or computing system, or similar electronic computing devices, that manipulate and/or transform data represented as physical, such as electronic, quantities into other data similarly represented as physical quantities.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention. Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with instructions for carrying out such a method or element of a method forms a means for carrying out the method or element of a method. Note that when the method includes several elements, e.g., several steps, no ordering of such elements is implied, unless specifically stated. Furthermore, an element described herein of an apparatus embodiment is an example of a means for carrying out the function performed by the element for the purpose of carrying out the embodiments of the invention. In the description provided herein, numerous specific details are set forth. However, it is understood that embodiments of the invention may be practiced without these specific details. In other instances, well-known methods, structures and techniques have not been shown in detail in order not to obscure an understanding of this description.

The person skilled in the art realizes that the present invention by no means is limited to the preferred embodiments described above. On the contrary, many modifications and variations are possible within the scope of the appended claims. For example, any dynamic control based on the wind noise state (being a smoothed version of the wind noise indicator) may be replaced with the wind noise indicator regardless of the win noise indicator being a scalar value or a binary metric. While the smoother, and over time more stable, wind noise state has features beneficial effects in terms of not resulting in rapid, noticeable, changes in audio processing it is understood that for some audio signals usage of the wind noise indicator directly offers sufficient performance. Additionally, while most exemplary implementations are described with audio signals of one or two channels, the method and system can also be applied to three or more channels in an analogous manner. For instance, the processing may be based on pair-wise selection among the multiple channels.

The invention claimed is:

1. A method for suppressing wind noise comprising:

obtaining an input audio signal comprising a plurality of consecutive audio signal segments;

suppressing wind noise in the input audio signal with a wind noise suppressor module to generate a wind noise reduced audio signal, the wind noise suppressor module comprising a high-pass filter;

using a neural network trained to predict a set of gains for reducing noise in the input audio signal given samples of the input audio signal, wherein a noise reduced audio signal is formed by applying said set of gains to the input audio signal; and mixing the wind noise reduced audio signal and the noise reduced audio signal with a mixer to obtain an output audio signal with suppressed wind noise.

2. The method according to claim 1, further comprising:

determining, with a wind noise detector, a respective wind noise indicator for each segment of the input audio signal, the respective wind noise indicator indicating at least one of a probability and a magnitude of wind noise in each respective segment.

3. The method according to claim 2, further comprising:

determining, based on at least one respective wind noise indicator, a wind noise state.

4. The method according to claim 3, wherein the filter coefficients of the high-pass filter are based on the wind noise state.

5. The method according to claim 3, wherein each of said input audio signal, said wind noise reduced audio signal and said noise reduced audio signal comprises two audio channels, the method further comprising:

providing the wind noise state to a gain steering module;

if the wind noise state for said two channels exceeds a first threshold level or if a difference between the wind noise states of said two channel is below a second threshold level, determining, a common set of gains based on the predicted set of gains of at least one of the two channels; and applying the common set of gains to both channels;

else, applying each set of gains to the corresponding channel.

6. The method according to claim 5, wherein the common set of gains is an average, a maximum or a minimum gain across the sets of gains.

7. The method according to claim 3, wherein determining, based on at least one respective wind noise indicator, a wind noise state comprises:

providing the wind noise indicator to a state machine with at least two states:

a no-wind-noise state, NWN, and a wind-noise-hold state, WNH, wherein the state machine transitions to the WNH state in response to detecting a first number of subsequent segments each having a respective wind noise indicator exceeding a high threshold, and outputs a high wind noise state, at least until the next state change, and wherein the state machine transitions to the NWN state in response to detecting a second number of subsequent segments each having a respective wind noise indicator below a first low threshold, and outputs a low wind noise state at least until the next state change.

8. The method according to claim 7, wherein the state machine has four states, the no-wind-noise state, NWN state, the wind-noise-hold state, WNH state, a wind-noise-attack state, WNA, and a wind-noise-release state, WNR, wherein the state machine transitions from the NWN state to the WNA state in response to detecting a segment having a respective wind noise indicator exceeding the high threshold and outputs the low wind noise state at least until the next state change, wherein the state machine transitions from the WNA state to the WNH state in response to detecting the first number of subsequent segments having a respective wind noise indicator exceeding the high threshold and outputs a high wind noise state at least until the next state change, wherein the state machine transitions from the WNH state to the WNR state in response to detecting a segment having a wind noise indicator being below the first low threshold and outputs the high wind noise state at least until the next state change, wherein the state machine transitions from the WNR state to the NWN state in response to detecting the second number of subsequent segments being below the first low threshold and outputs the low wind noise state at least until the next state change.

9. The method according to claim 8, wherein the state machine transitions from the WNR state to the WNA state in response to detecting a segment having a respective wind noise indicator exceeding the high threshold and outputs the high wind noise state at least until the next state change.

10. The method according to claim 3, wherein determining the wind noise state comprises:
smoothing the wind noise indicator across at least two segments, wherein the wind noise state is based on the smoothed wind noise indicator.

11. The method according to claim 3, further comprising:
controlling, for each segment of the input audio signal, a mixing ratio of the mixer based on the wind noise state.

12. The method according to claim 2, wherein said input audio signal, wind noise reduced audio signal and noise reduced audio signal comprises two audio channels, and
wherein determining the wind noise indicator is based on monaural features of each individual audio channel and difference features associated with both audio channels.

13. The method according to claim 2, wherein said input audio signal, wind noise reduced audio signal and noise reduced audio signal comprises two audio channels, said method further comprising:
determining, with a Dual-Mono detector, whether a corresponding segment of each of the two audio channels are similar Dual-Mono segments or dissimilar non Dual-Mono segments based on a spectral power distribution of the segments in at least one frequency band;
if said segments are non Dual-Mono segments, determining the wind noise indicator based on monaural features and difference features associated with both segments;
else, determining the wind noise indicator based on only monaural features of each individual segments.

14. The method according to claim 13, wherein the step of determining whether the two audio segments are similar Dual-Mono segments or dissimilar non Dual-Mono segments comprises:
determining a first sum as the sum of the absolute value of the spectral difference between the two audio segments of the input audio signal;
determining a second sum as the sum of the total spectral energy for each of the segments;
calculating a ratio between said first sum and said second sum;
if said ratio is below a predetermined ratio threshold value and the second sum exceeds a predetermined sum threshold value, the segments are determined to be similar Dual-Mono segments; and
else, the segments are determined to be dissimilar non Dual-Mono segments.

15. The method according to claim 2, further comprising:
forming a non-real-time global wind noise indicator by aggregating the respective wind noise indicators for two or more segments of the plurality of audio segments of the input audio signal;
wherein the filter coefficients of the high-pass filter are based on the non-real-time global wind noise indicator.

16. The method according to claim 2, further comprising:
forming a non-real time global wind noise indicator by aggregating the respective wind noise indicators for two or more segments of the plurality of audio segments of the input audio signal; and
controlling, for each segment of the input audio signal, the mixing ratio of the mixer based on the non-real time global wind noise indicator.

17. The method according to claim 1, wherein each set of gains comprises a plurality of gains associated with a respective frequency band of the audio signal.

18. The method according to claim 1, wherein said mixing of the wind noise reduced audio signal and the noise reduced audio signal is performed with a fixed mixing ratio.

19. A wind noise suppression system, comprising a processor and a memory coupled to the processor, the memory storing one or more programs including instructions for:
obtaining an input audio signal comprising a plurality of consecutive audio signal segments;
suppressing wind noise in the input audio signal with a wind noise suppressor module to generate a wind noise reduced audio signal, the wind noise suppressor module comprising a high-pass filter;
using a neural network trained to predict a set of gains for reducing noise in the input audio signal given samples of the input audio signal, wherein a noise reduced audio signal is formed by applying said set of gains to the input audio signal; and
mixing the wind noise reduced audio signal and the noise reduced audio signal with a mixer to obtain an output audio signal with suppressed wind noise.

20. A non-transitory computer-readable storage medium storing one or more computer programs including instructions for:
obtaining an input audio signal comprising a plurality of consecutive audio signal segments;
suppressing wind noise in the input audio signal with a wind noise suppressor module to generate a wind noise reduced audio signal, the wind noise suppressor module comprising a high-pass filter;
using a neural network trained to predict a set of gains for reducing noise in the input audio signal given samples of the input audio signal, wherein a noise reduced audio signal is formed by applying said set of gains to the input audio signal; and
mixing the wind noise reduced audio signal and the noise reduced audio signal with a mixer to obtain an output audio signal with suppressed wind noise.

* * * * *